March 24, 1942.    N. J. CARBIS    2,277,298
ELECTRODE HOLDER
Filed June 27, 1941
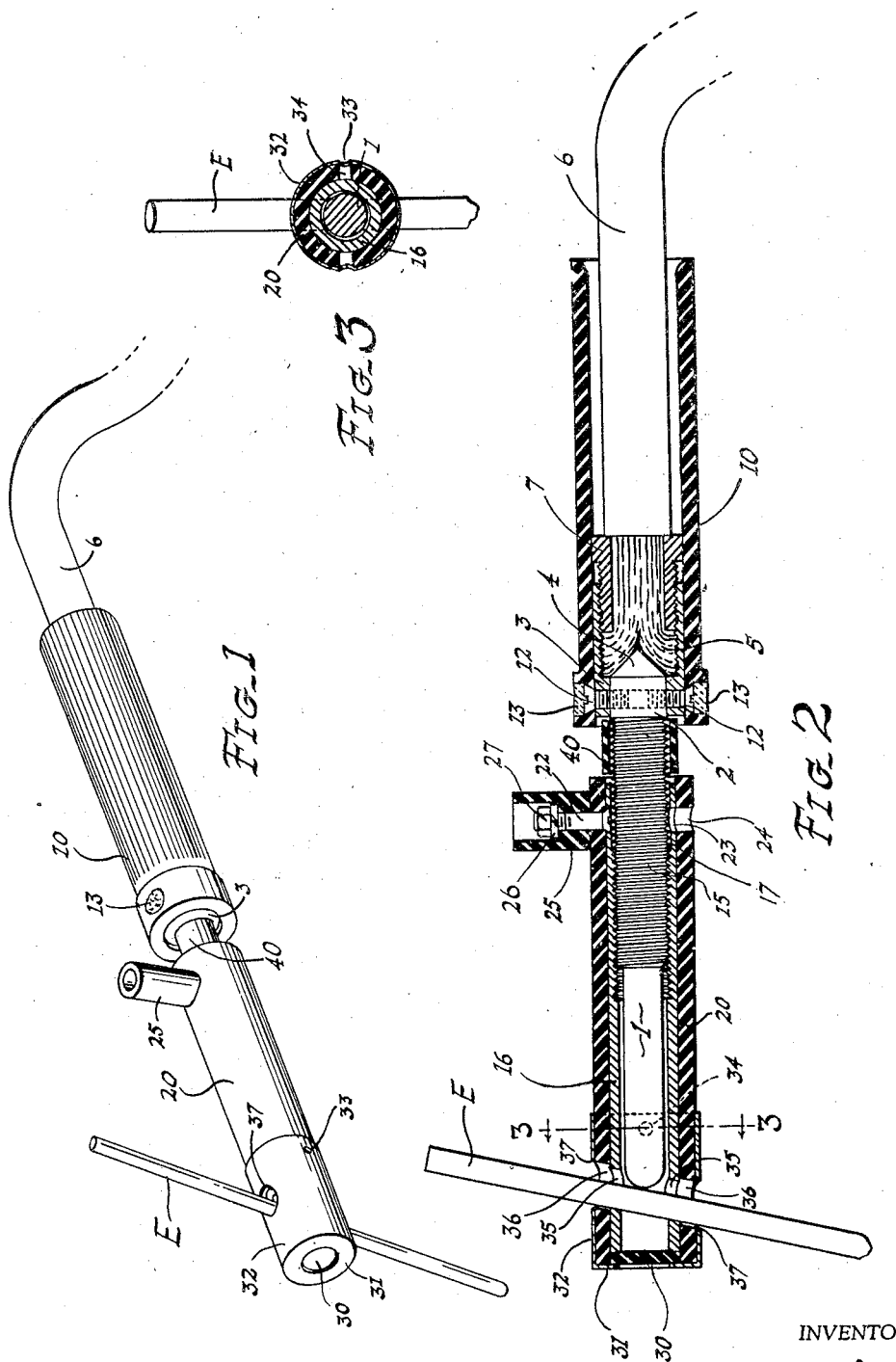
INVENTOR,
Norbert J. Carbis
BY
Hull + West
ATTORNEYS.

Patented Mar. 24, 1942

2,277,298

UNITED STATES PATENT OFFICE 2,277,298

ELECTRODE HOLDER

Norbert J. Carbis, Cleveland Heights, Ohio

Application June 27, 1941, Serial No. 400,034

3 Claims. (Cl. 219—8)

This invention relates to improvements in electric welding equipment, and more particularly to electrode or welding rod holders for use in hand welding operations.

Objects of the invention are to provide a highly efficient electrode holder that is especially convenient of use, and that is well balanced so as to facilitate the maneuvering of the holder in welding operations and minimize fatigue.

Another object is to provide a device of the aforesaid character that is thoroughly insulated for the operator's protection against electrocution, shock or burn, and so as to avoid arcs occurring between the holder and the charged object that is being welded in case the device is accidentally struck against the object or inadvertently laid thereon.

Another purpose of the invention is to provide an electrode holder in which the clamping parts that grasp the electrode or welding rod are of such nature as to provide a strong mechanical and very effective electrical connection between the electrode and the current conducting parts of the holder and which are adapted to electrodes of different sizes, and are convenient of manipulation for adjusting the electrode as the same becomes consumed in the weld.

A further object is to provide a construction which affords ready accessibility to the clamping pin and renders reconditioning of the same in case of wear especially convenient, and which construction facilitates re-sizing of one of the insulating elements to compensate for the shortening of the clamping pin due to reconditioning.

A further object of the invention is to provide a metallic protecting cap for the insulating element that surrounds the electrode clamping parts and which is properly spaced and insulated from the electrode and metallic parts of the holder so as to avoid the same being charged with electricity, the protecting cap avoiding damage to the insulating material and protecting it from metal splash and the formation of metal barnacles thereon, and by reason of which protection the life of the insulating material is appreciably prolonged.

A still further object is to provide a construction for manual electrode holders that is simple and inexpensive in that practically all parts are adapted to production on either screw machines or punch presses and are so designed as to facilitate assembly and disassembly and replacement of parts.

The foregoing objects with others hereinafter appearing are attained in the embodiment of the invention illustrated in the accompanying drawing, and while I shall proceed to describe the same in detail, it will be understood that I do not limit myself to the structural details of the embodiment shown further than is required by the terms of the claims annexed hereto.

In the drawing, Fig. 1 is a perspective view of my improved electrode holder; Fig. 2 is a central longitudinal section, and Fig. 3 is a transverse section on the line 3—3 of Fig. 2.

Referring to the parts by reference characters, 1 designates the clamping pin, which may be made of steel, or a suitable alloy that is very hard and of high electrical conductivity. Its forward end is desirably rounded, while its rear end is formed with a cylindrical head 2 that is fitted within the end of an internally threaded socket member 3, the socket member and pin being brazed or otherwise secured together. Centrally within the socket member 3 is a cone 4 which I prefer to form as an integral part of the head 3 although the same may consist of a separate piece. Mushroomed over this cone are the strands 5 of an electric cable 6, the strands being clamped within the socket member and about the cone by a sleeve nut 7 that is screwed into the socket member. In lieu of the connection described, the strands of the cable may be soldered within the socket member, or otherwise secured with an efficient electrical connection to the rear end of the clamping pin.

Fitted over the socket member 3 and the adjacent portion of the cable 6 is a cylindrical tubular handle 10 of fiber or other durable insulating material, the same being shown as slightly enlarged at its forward end and being provided with diametrically opposed holes that are tapered at their inner ends for the reception of the correspondingly shaped heads of screws 12 that are extended through said holes and through holes in the socket member 3 and are threaded into the head 2 of the clamping pin 1. The holes in the handle outwardly of the screws 12 may be filled with an insulating cement, as indicated at 13.

The clamping pin is threaded from the head 2 forwardly to within a substantial distance of its forward end, the threaded portion being designated 15, and screwed onto the portion 15 is the internally threaded rear end portion of a steel clamping tube 16. For a short distance inwardly from its rear end the tube is counterbored and devoid of thread, as indicated at 17.

Fitted over the tube 16 is a sleeve 20 of insulating material, such as impregnated asbestos, wood or paper; a suitable plastic; pyrex; porcelain, or the like, and the sleeve is held to the tube 16 by a bolt 22 that is projected through aligned openings 23 and 24 in the tube and sleeve, respectively, and inserted through diametrically opposed holes in said parts, the latter hole of the clamping tube being tapered to receive the correspondingly shaped head of the bolt. Engaged over the outer end of the bolt is a tubular finger piece 25 of fiber or other insulating material counterbored from its outer end to provide a shoulder against which a lock washer 26 is clamped by a nut 27 that is applied to the bolt. The inner end of the finger piece 25 is shaped to fit the contour of the sleeve 20, said finger piece being thus held against rotation.

It will be observed that the sleeve 20 extends beyond the forward end of the clamping tube 16, and a disk 30 of impregnated asbestos, fiber, or other appropriate insulating material, is fitted into the end of the sleeve against the end of the tube 16 and is held in place by the annular end flange 31 of a protecting cap 32 of copper or other metal, the cap being shown as held upon the sleeve 20 by having parts 33 indented within diametrically opposed holes 34 of the sleeve, as clearly shown in the sectional detail of Fig. 3.

Adjacent their forward ends, the opposed walls of each, the tube 16 and sleeve 20, are provided with transverse openings 35 and 36, respectively, the common axis of the opposed openings preferably being inclined to the longitudinal axis of the tube and sleeve. Openings 37 in the cap 32 register with the openings 36 of the sleeve 20. The diameter of the openings 35, 36 and 37 are desirably progressively increased in the order named so that when an electrode or welding rod E is extended through said openings and clamped firmly between the outer side of the openings 35 of the metal clamping tube 16 and the end of the clamping pin 1, it will not contact the sleeve 20 or the cap 32. The cap is thus prevented from becoming charged with electricity, and the insulating material of the sleeve is protected against damage from the electrode being forced against it.

The openings 35 of the clamping tube 16 are made of ample size to receive the largest electrode wherewith the device is designed for use, and the adjustment between the clamping tube and handle is sufficient, not only to permit the clamping tube to be fed rearwardly along the clamping pin sufficiently to grasp the smallest electrode intended to be used with the holder, but also to allow for some reduction in the length of the clamping pin resulting from grinding off its forward end in the reconditioning of the pin after wear. Such reconditioning may be minimized by using a very hard grade of steel or other alloy, as previously mentioned, or by brazing or otherwise securing to the forward end of the pin a tip of hardened steel or other very hard metal. A thimble 40 of fiber or other insulating material may be applied to the threaded portion of the clamping pin between the rear end of the clamping tube 16 and the handle so as to prevent contact of person or objects with a charged part of the holder. This thimble is originally short enough to permit relative adjustment between the clamping tube and clamping pin sufficient to take care of the full range of sizes of electrodes that are to be handled, and as the pin becomes shorter through reconditioning, the thimble 40 may be cut or ground down in length accordingly.

In the use of the holder, the welder grasps it by the handle 10 and rotates the front assembly comprising the clamping tube 16 and the sleeve 20 so as to feed them forwardly along the clamping pin enough to permit an electrode E of selected size to be projected through the aligned openings of the tube, sleeve and cap 32. Thereafter, by reversing the foregoing operation, the clamping tube and parts carried thereby may be fed rearwardly until the electrode is clamped very firmly between the front sides of the openings 35 and the forward end of the pin 1, the operation being facilitated by the use of the finger piece 25, especially in the final clamping of the electrode. By reason of the threaded connection between the clamping tube and pin (which, by the way, is desirably of standard character for the sake of economy of production) the electrode may be very firmly held, insuring a strong mechanical and efficient electrical connection between the current conducting parts of the holder and the electrode. The fact that the finger piece 25 extends laterally from the sleeve 20, provides effective leverage, and permits the welder to obtain a firm pressure thereagainst with thumb or finger.

Because the metal parts of the holder that carry the current are so thoroughly insulated, the tool is very safe. The user is protected from electrocution, shock or burns, as previously mentioned, and arcing is avoided between the holder and the grounded metallic object that is being welded, should the tool be accidentally struck against the object, or inadvertently laid thereon, while energized. Furthermore, the metallic cap 32 protects the enclosed insulating material from damage in case the tool is struck against hard objects of any sort, and also, during welding operations, shields the insulating material in the region where it is most exposed thereto from metal splash and the formation of metal barnacles thereon, and which have an injurious and deteriorating effect upon such material.

Obviously, my improved construction affords ready accessibility to all parts for inspection, replacement or repair. If it is desired to remove the sleeve 20 from the tube 16, the tube may be unscrewed from the pin 1 and a screw driver inserted through the holes 23 and 24 for engagement with the head of the bolt 22. Upon removal of the bolt, the finger piece 25 falls away and the sleeve may be withdrawn from the tube. By the removal of the cement 13, if used, and the screws 12, the handle 10 may be withdrawn from the socket member 3 so as to give access to the connection between the cable 6 and the socket member.

Having thus described my invention, what I claim is:

1. An electrode holder comprising a clamping pin having a threaded portion intermediate its ends, means connecting an electrical conductor to the rear end of the pin, a tubular handle of insulating material surrounding and attached to said rear end of the pin and enclosing the adjacent part of the conductor, an internally threaded clamping tube screwed onto the threaded portion of the pin for adjustment therealong and projecting forwardly of the front end of the pin, a sleeve of insulating material fitted over and enclosing the tube, the sleeve and tube having registering transverse openings through which an electrode may be extended for clamping engagement between the forward sides of the openings of the tube and the front end of the pin, a finger piece applied to and extending laterally from the rear end portion of the sleeve, and means serving the two-fold purpose of connecting the finger piece to the sleeve and detachably securing the sleeve to the tube.

2. An electrode holder comprising a clamping pin having a threaded portion intermediate its ends, means connecting an electrical conductor to the rear end of the pin, a tubular handle of insulating material surrounding and attached to said rear end of the pin and enclosing the adjacent part of the conductor, an internally threaded clamping tube screwed onto the threaded portion of the pin for adjustment therealong and projecting forwardly of the front end of the pin, a sleeve of insulating material fitted over and enclosing the tube, the sleeve and tube having registering transverse openings through which an electrode may be extended for clamping engagement between the forward sides of the openings of the tube and the front end of the pin, the sleeve and tube having aligned, diametrically opposed holes adjacent their rear ends, the holes on one side being larger than those on the other, a bolt adapted to be projected completely through and beyond the larger holes from the outside of the sleeve to the inside of the tube and thence inserted outwardly through the smaller holes, the smaller hole of the tube being counterbored to accommodate the head of the bolt thereby to leave the bore of the tube clear, a tubular finger piece engaged over the protruding portion of the bolt, and means securing the finger piece to the bolt.

3. An electrode holder comprising a clamping pin having a threaded portion intermediate its ends, means connecting an electrical conductor to the rear end of the pin, a tubular handle of insulating material surrounding and attached to said rear end of the pin and enclosing the adjacent part of the conductor, an internally threaded clamping tube screwed onto the threaded portion of the pin for adjustment therealong and projecting forwardly of the front end of the pin, a sleeve of insulating material fitted over and enclosing the tube, the sleeve and tube having registering transverse openings through which an electrode may be extended for clamping engagement between the forward sides of the openings of the tube and the front end of the pin, the sleeve and tube having aligned, diametrically opposed holes adjacent their rear ends, the holes on one side being larger than those on the other, a bolt adapted to be projected completely through and beyond the larger holes from the outside of the sleeve to the inside of the tube and thence inserted outwardly through the smaller holes, the smaller hole of the tube being shaped to receive the bolt head thereby to leave the bore of the tube clear, a tubular finger piece engaged over the protruding portion of the bolt, the outer end of the finger piece being counterbored to provide an internal shoulder and a lock washer and nut applied to the bolt with the former engaging said shoulder and both enclosed by the counterbored portion of the finger piece.

NORBERT J. CARBIS.